Figure 1:
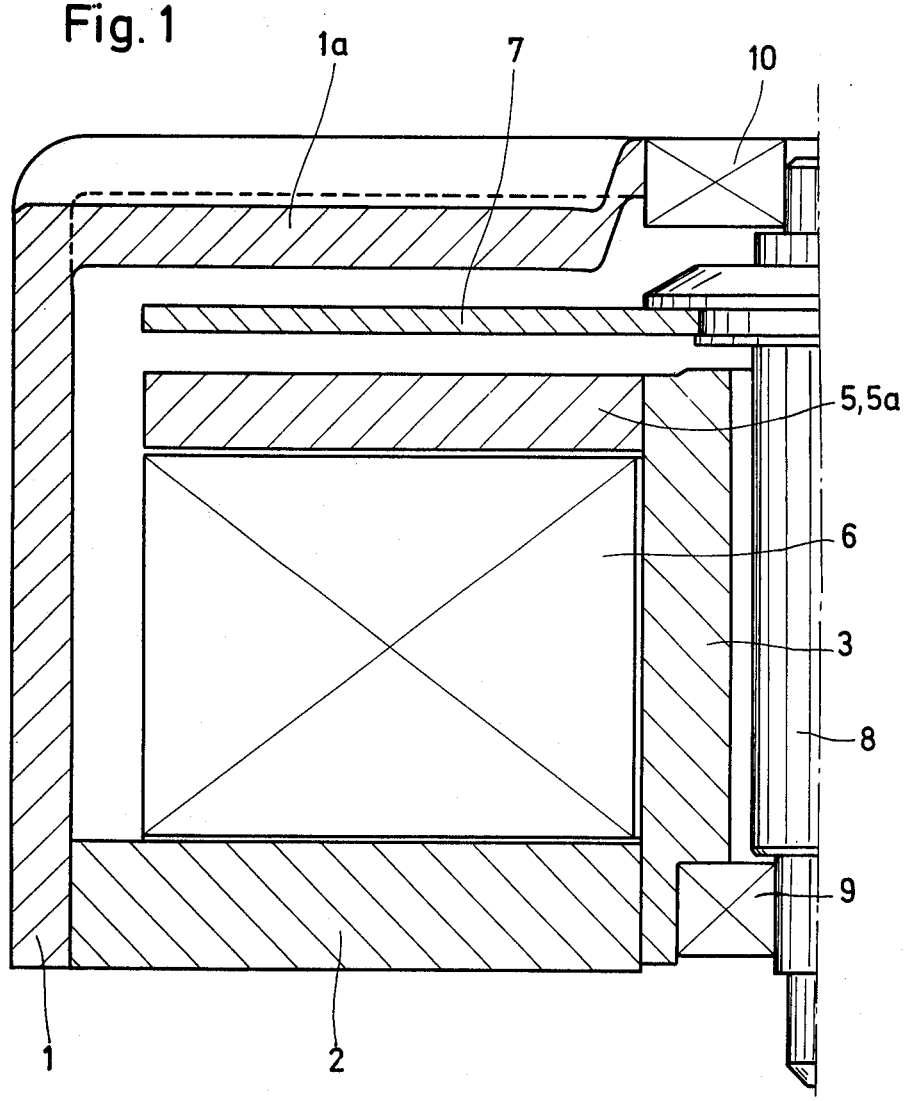

United States Patent [19]
Oudet et al.

[11] 4,079,279
[45] Mar. 14, 1978

[54] ELECTRICAL MICROMOTOR

[75] Inventors: Claude Oudet, Besancon; Georges Stcherbatcheff, Meudon, both of France

[73] Assignee: Portescap, La-Chaux-de-Fonds, Switzerland

[21] Appl. No.: 598,150

[22] Filed: Jul. 22, 1975

[30] Foreign Application Priority Data

Jul. 25, 1974 France .............................. 74 25887

[51] Int. Cl.² .............................................. H02K 19/00
[52] U.S. Cl. ..................................... 310/164; 310/268
[58] Field of Search ................... 310/40, 40 MM, 156, 310/268, 162–164, 46, 49; 58/23, 23 D

[56] References Cited
U.S. PATENT DOCUMENTS

| | | | |
|---|---|---|---|
| 3,435,267 | 3/1969 | Beyersdorf | 310/268 |
| 3,469,133 | 9/1969 | Stcherbatcheff | 310/164 |
| 3,469,134 | 9/1969 | Beyersdorf | 310/268 |
| 3,539,845 | 11/1970 | Stcherbatcheff | 310/46 |
| 3,614,495 | 10/1971 | Suzuki | 310/268 |
| 3,678,311 | 7/1972 | Matting | 310/156 |
| 3,784,850 | 1/1974 | Inaba | 310/268 |
| 3,845,335 | 10/1974 | Oguey | 310/49 |
| 3,860,842 | 1/1975 | Schwab | 310/268 |
| 3,867,656 | 2/1975 | Mitsui | 310/156 |

*Primary Examiner*—R. Skudy
*Attorney, Agent, or Firm*—Young & Thompson

[57] ABSTRACT

The invention relates to miniature electric motors, more particularly to monophase synchronous motors of the type the motor of which includes two pole pieces respectively polarized positively and negatively by the current circulating in an energizing coil, these pole pieces having each N teeth and defining a gap in which is placed a thin, disc-shaped rotor of hard magnetic material. The rotor comprises two annular coaxial portions magnetized with respectively N and N/2 pairs of alternately positive and negative poles.

These motors can be adapted to step-by-step working under constant sign pulse feed and are particularly suitable for use in cases where size and power consumption must be reduced to a minimum, such as in electric clockwork movements.

3 Claims, 2 Drawing Figures

ELECTRICAL MICROMOTOR

The invention relates to small electric motors of the general type described in the U.S. Pat. No. 3,539,845. Such motors comprise a main magnetic circuit formed of a stator and a rotor, the stator bearing a coil for creating a torque due to a current, and the rotor including a thin part of hard magnetic material magnetized in the direction of its thickness so as to present over its circumference N pairs of alternately positive and negative poles. The stator includes two pole pieces respectively polarized positively and negatively by the current circulating in the said coil, these two pole pieces defining a gap in which the said thin part of the rotor is placed for rotation. At least one of the said pole pieces comprises N teeth.

In prior art motors of this type an auxiliary polarized magnet system is provided for creating an artificial torque which is independent of the current and results in a torque suitable for the special purpose of the motor, in particular for instance for use as a stepping motor with constant sign pulse feed. The known auxiliary magnet systems include at least one member which is mechanically separated from the members forming the main magnet circuit.

It is a first object of the present invention to provide a micromotor of the above type which is of a very simple design by mechanically combining the means for creating a torque due to a current with the means for obtaining a residual torque of a predetermined valve in the absence of current.

A further object of the invention is to provide such a micromotor of reduced height, the obtained height being primarily determined by the volume of the coil.

Still a further object is to make optimal use of the surface of the rotor by using practically the whole available surface for producing the different torque components.

In the monophase synchronous motor according to the invention, the rotor includes a thin disc of hard magnetic material which is placed for rotation in the gap defined by the stator pole pieces and which comprises two coaxial annular portions magnetized respectively with N and N/2 pairs of alternately positive and negative poles. The two series of poles cooperate with the single set of stator poles to produce the required torque components.

The mentioned and other objects as well as the advantages of the invention will appear clearly as a result of the following description.

Figure 2:
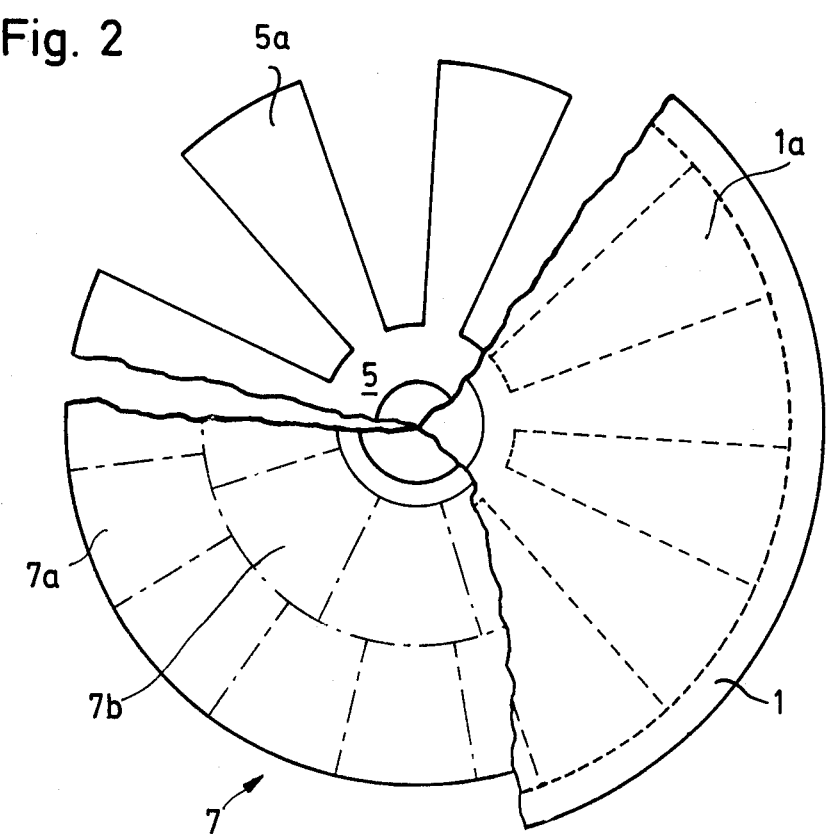

In the appended drawings:

FIG. 1 is a half axial section through a motor embodying the present invention, and FIG. 2 is a schematic view, from the upper side of the motor, with parts cut away, showing the pole pieces and the rotor with its magnetized portions.

The micromotor shown in FIG. 1 has a stator structure of magnetically permeable material, comprising a cup-shaped motor casing 1, a coaxial ring-shaped end plate 2, a central tubular member 3 and an inner flat pole piece 5. An electric coil 6 which receives the energizing current, for instance pulses of constant sign, is coaxially mounted on the tubular member 3 between the flat pole piece 5 and the end plate 2. The bottom of the motor casing 1 forms the outer pole piece of the stator and is embossed to form N teeth 1a directed towards the inside of the motor. These teeth extend radially and are regularly spaced around the entire ring-shaped surface of the bottom of the casing. The inner pole piece 5 comprises N cut-out teeth 5a similar in shape to the teeth formed on the bottom of the casing and facing the same. This structure provides for an air gap varying periodically in the direction of rotation of the rotor.

A thin disc 7 of hard magnetic material having a high coercive field, such as a platinum-cobalt alloy, is the active part of the rotor. It is supported by a central axle 8 for rotation in the stator gap, the axle 8 being supported in bearings 9 and 10 which are mounted respectively in the tubular member 3 and the casing 1.

FIG. 2 shows the disc 7 having a first annular portion 7a in which 2 N areas in the shape of sectors of this annular portion are magnetized parallely to the axis of the disc and with alternating polarity. The annular portion 7a has N pairs of alternately positive and negative poles over the whole circumference, which is to say that they are arranged in an annular series entirely about a first annular coaxial portion of the rotor. The outer diameter of the annular portion 7a is nearly that of the rotor disc, the inner diameter being f.i. equal to 3/5 of the outer diameter. The angle at the center of the magnetized sectors of this outer annular portion is $\pi/N$.

In accordance with the present invention, the disc 7 has a second annular portion 7b comprising a second series of areas, magnetized in the axial direction in a similar manner as those of the outer portion 7a. However, the inner portion has N/2 pairs of alternately positive and negative poles, which, like those of annular portion 7a, are arranged in an annular series entirely about this second portion of the rotor, as is clear from the drawing. Its outer diameter is slightly inferior to the inner diameter of the first annular portion, while its inner diameter is approximately equal to that of the teeth of the stator. The same is limited in practice by the limitations in manufacturing the teeth. The angle at the center of the magnetized sectors of the second annular portion is $2\pi/N$.

As is also evident from FIG. 2, one of these first and second annular portions 7l and 7b is disposed radially outwardly and the other radially inwardly on the rotor.

When a current energizes the coil 6 of the motor, the N pairs of outer poles 7a of the rotor cooperate with the stator poles to provide a driving torque due to the said current.

The N/2 pairs of poles of the inner annular portion 7b of the rotor cooperate with the teeth of the stator poles to produce an artificial residual torque providing a desired level of torque in the absence of energizing current. An appropriate angular shifting of the inner poles of the rotor with respect to those of the outer annular portion is obtained at the time of magnetising the rotor. The angular position of the outer and inner rotor poles with respect to each other determines the phase relationship of the sinusoidal terms of same frequencies of the mentioned torque components.

It results from the foregoing description, that the various objects of the invention are achieved by the described embodiment. Various modifications can be introduced in this embodiment without departing from the spirit and scope of the invention as defined in the appended claims. In particular, the shape of the stator pole pieces and the shape of the magnetized areas forming the mentioned annular portions of the rotor can be different from the one described by way of example.

What we claim is:

1. A monophase synchronous motor comprising a main magnetic circuit formed of a stator and a rotor, a coil magnetically coupled to the stator, said rotor including a thin disc of hard magnetic material a first annular coaxial portion of which is axially magnetized with a number N of pairs of alternately positive and negative poles arranged in an annular series entirely about said first portion of said rotor, said stator including two pole pieces respectively polarized positively and negatively when said coil is energized by a current, these two pole pieces being arranged in axially opposite relationship to define an air gap in which the rotor is disposed for rotation about its axis and one at least of these two pole pieces comprising N teeth, said main magnetic circuit producing a driving torque for the rotor upon energization of said coil, said motor further including an auxiliary polarized magnet system which comprises a second annular coaxial portion of the rotor, said second portion being axially magnetized with N/2 pairs of alternately positive and negative poles arranged in an annular series entirely about said second portion of said rotor and placed in a gap formed by corresponding portions of the said two pole pieces facing the said second annular portion of the rotor to provide an artificial residual torque component, one of said first and second portions being disposed radially outwardly and the other radially inwardly on said rotor.

2. A monophase synchronous motor according to claim 1 wherein one of the said two pole pieces of the stator has N cut-out teeth and the other is formed by a part of the casing of the motor having N teeth-line embossed portions facing said cut-out teeth.

3. A monophase synchronous motor according to claim 1 wherein the magnetized areas forming the poles on the rotor are sectors of the annular rotor portions.

* * * * *